Oct. 29, 1957   N. D. BUCCIARELLI   2,810,982
MECHANICAL LINE RELEASE FOR SPINNING REEL
Filed July 18, 1956
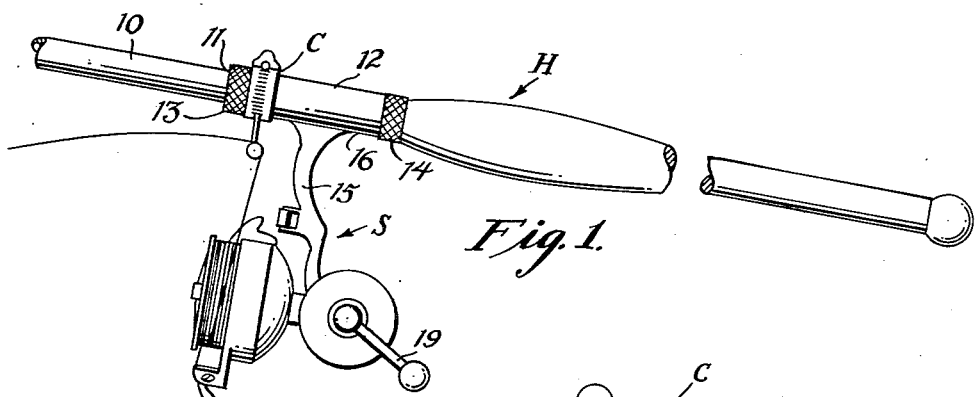
Fig. 1.
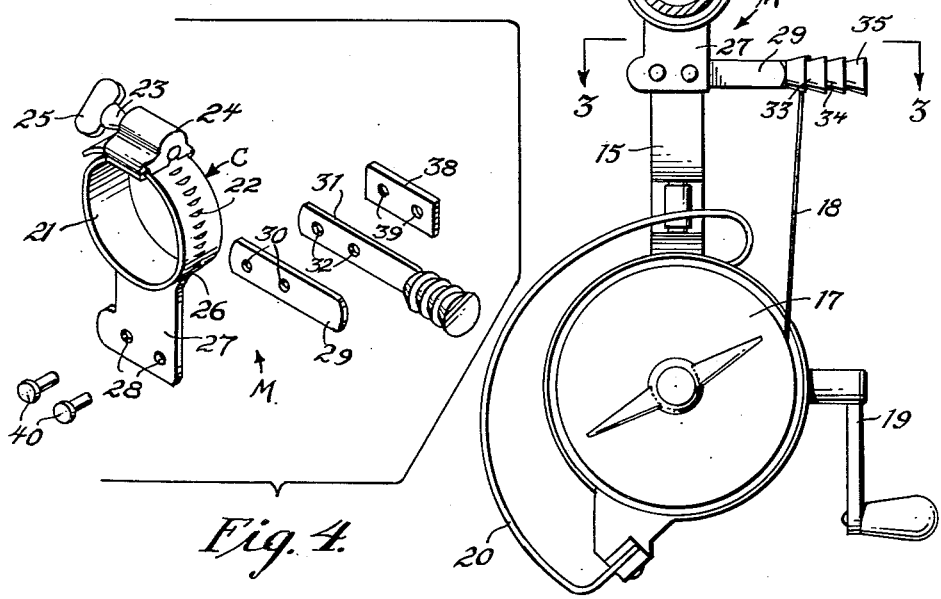
Fig. 4.
Fig. 2.
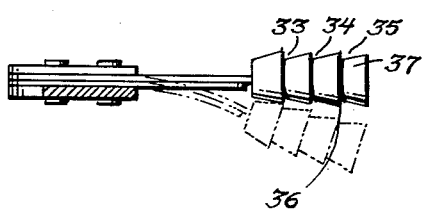
Fig. 3.
INVENTOR.
NICHOLAS D. BUCCIARELLI
BY
ATTORNEY.

United States Patent Office 2,810,982
Patented Oct. 29, 1957

2,810,982

MECHANICAL LINE RELEASE FOR SPINNING REEL

Nicholas D. Bucciarelli, Philadelphia, Pa.

Application July 18, 1956, Serial No. 598,639

5 Claims. (Cl. 43—25)

The present invention relates to the spinning reels commonly employed in that particular fishing operation known as casting, and is concerned primarily with a mechanical line release for such a spinning reel.

At the present time, spinning reels are commonly employed in casting from the beach, piers, and boats, and may be generally characterized as including a fixed reel that is mounted generally midway of a jointed fishing rod beneath the joinder of the two sections thereof and with its axis substantially parallel to that of the rod. A monofilament line is now commonly employed in spinning reels of the type with which this invention is concerned; and, prior to the advent of this invention, it has been the practice for the caster to employ one finger to hold the line as it leaves the reel in making the cast. It has been necessary for the caster to release his finger from the line at exactly the right moment to avoid injury such as cutting of the finger by the monofilament line.

A spinning reel of the type with which this invention is concerned is ordinarily employed in conjunction with a dipsey that is secured to the free end of the line. Such dipseys generally vary in weight from 1½ to 2½ ounces; and it is this dipsey, in conjunction with the caster's finger, which maintains the line taut along the rod as a cast is being made.

With the foregoing conditions in mind, the present invention has in view as its foremost objective the provision of a spinning reel of the character aforesaid, together with a mechanical line release which cooperates with the dipsey in maintaining the line under a proper degree of tension as it extends along the rod and as a cast is made. The line release is so designed that, once the cast is made and the line starts to pay out, it comes free of the release; whereupon the line is payed out in the now conventional manner.

More in detail, the invention has as an object the provision of a mechanical line release of the character indicated which consists essentially of a resilient arm, together with an appropriate clamp for mounting the arm on the fishing rod immediately above the spinning reel, with the arm extending in a direction normal to the extent of the fishing rod. The line is passed over this arm when a cast is to be made; and, when the force which is exerted by the dipsey on the line becomes sufficiently great due to the making of the cast, the arm gives and the line comes free thereof to be payed out in the ordinary manner.

Yet another object of the invention is to provide, in a mechanical line release of the character aforesaid, a resilient arm which is formed adjacent to its free ends with three grooves, any one of which is adapted to receive the line. The outermost groove is intended for the reception of the line when the lightest dipsey is employed, and the innermost groove for the heaviest dipsey. Thus, for dipseys of 1½, 2, and 2½ ounces, the outermost groove is utilized for the 1½-ounce dipsey, the intermediate groove for the 2-ounce dipsey, and the innermost groove for the 2½-ounce dipsey.

Yet another object of the invention is to provide, in a mechanical line release of the type aforesaid, a resilient arm in the form of a leaf spring which carries the groove structure at its free end, together with a backing member that is intended to offer increased resistance to bending or giving of the arm and which is disposed in front of the arm. This backing member, together with the resilient arm, is secured to a bracket, which is in turn carried by a clamp that is secured to a section of a fishing rod adjacent to the joint. While most fishermen are right-handed, some are left-handed; and the direction in which the arm extends outwardly from the clamp depends on whether the fisherman is right- or left-handed. This direction will also determine the relation of the backing member with respect to the leaf spring.

Various other more detailed objects and advantages of the invention, such as arise in connection with carrying out the above-noted ideas in a practical embodiment, will in part become apparent and in part be hereinafter stated as the description of the invention proceeds.

The invention therefore comprises a mechanical line release for a spinning reel which consists essentially of a clamp that is intended to be secured to a jointed fishing rod beneath the joint thereof, and which clamp carries a bracket. Secured to this bracket and extending outwardly in a direction normal to the extent of the fishing rod is a leaf spring having a grooved structure at its free end. This grooved structure is located above the spinning reel, that is also secured to the fishing rod, in position to have the line pass thereover while being received in one of the grooves; whereupon, when a cast is made, the force generated on the dipsey at the end of the line will cause the spring to give and permit the line to come free of the grooved structure and be payed out in the usual manner.

For a full and more complete understanding of the invention, reference may be had to the following description and accompanying drawing, wherein:

Figure 1 is a view in side elevation of that portion of a fishing rod with which this invention is concerned, and depicting the spinning reel and mechanical lines release therefor.

Figure 2 is a view taken normal to the showing of Figure 1, with a portion of the rod being shown in section.

Figure 3 is a detailed horizontal section through the line release, per se; and

Figure 4 is a perspective view illustrating the several elements of the line release in exploded relation.

Referring now to the drawing, wherein like reference characters denote corresponding parts, and first more particularly to Figure 1, the handle section of a fishing rod is referred to in its entirety by the reference character H, and is shown as broken away to permit illustration on an enlarged scale. Detachably secured to this handle section H is a front rod section 10, with the joint between the two being represented at 11.

The handle section H includes a straight cylindrical section 12, on the opposite ends of which are located two clamp rings 13 and 14. A spinning reel is referred to in its entirety by the reference character S, and includes a bracket member 15 having a foot or pedestal 16, the opposite ends of which are detachably clamped to the section 12 by the clamp rings 13 and 14. The spinning reel S includes a fixed drum or spool 17 on which is wound a monofilament line 18. A crank handle, shown at 19, is operable in conjunction with a bail 20 to wind the line 18 on the drum 17. When a cast is to be made, the bail 20 is swung back into an ineffective position.

The mechanical line release of this invention is illustrated in Figure 4 and referred to in its entirety by the reference character M. It comprises a clamp C, which preferably is of a type now well-known, and which consists essentially of a clamping ring 21 formed with a series of slots 22. A screw stem 23 has threads which engage the slots 22, and is mounted in a casing 24 that is carried by the overlapping ends of the ring C. The screw stem 23 is provided with an operating member 25, which may be availed of to loosen or tighten the clamp as occasion demands. It might be well to note that the present invention is not concerned with the details of the clamp C, because these clamps are now known and available as such in the fishing-rod art, and is simply taken as exemplary of the one clamp which may be employed to secure the mechanical line release of this invention to the rod. The clamping ring 21 is mounted on the section 12 of the handle H adjacent to the joint 11.

Depending downwardly from the clamping ring 21 and secured thereto in any preferred manner such as the welding or soldering indicated at 26, is a bracket 27 formed with a pair of openings 28. A backing member 29 is also formed with a pair of openings 30, the spacing of which corresponds to the spacing of the openings 28. This backing member 29 should be fairly rigid, although having some properties of resiliency and elasticity in that it must be capable of being bent under the force of the line, as will be later pointed out. It may be made from any appropriate material such as metal or plastic.

A leaf spring 31 is also formed with a pair of openings 32, the spacing of which corresponds to the openings 28 and 30. At its outer free end, the leaf spring 31 carries a grooved structure made up of grooves 33, 34, and 35. It will be noted, particularly from Figure 3, that each of the grooves 33, 34, and 35 is defined by a flat inner wall 36 and a conical wall 37, with the taper of the conical wall 37 being directed inwardly.

A retaining member 38 is formed with openings 39, the spacing of which corresponds to the openings 28, 30, and 32. The bracket 27, backing member 29, leaf spring 31, and retaining member 38 are assembled in the order depicted in Figure 4; whereupon a pair of headed rivets 40 is passed through the aligned openings 28, 30, 32, and 39, and the ends enlarged in a well-known manner to maintain the assembled relation.

Operation

When a cast is to be made, the bail 20 is first swung into an out-of-the-way ineffective position. The line 18 is then positioned in one of the grooves 33, 34, or 35, depending on the weight of the dipsey at the free end of the line. Thus, in the condition depicted in Figure 2, the heaviest, or 2½-ounce dipsey, is at the end of the line 18. This means that the line 18 is received in the groove 33. The caster now may employ both hands to make the cast, because the weight of the dipsey, together with the line release M, will maintain that portion of the line 18 which extends beneath the rod under a sufficient degree of tension to maintain it taut. As the cast is made, the speed of movement which is imparted to the dipsey generates sufficient force on the line 18 to cause the latter to bend the leaf spring 31, as well as the backing member 29, into the position depicted by broken lines in Figure 3. In this position, the line 18 can slide off the conical surface 37 of the particular groove in which it is received. Thus the line is freed from the release and is paid out from the drum 17 in the usual manner.

The main advantages which attend the use of the mechanical line release of this invention are:

(1) It is entirely unnecessary for the caster to employ a finger to hold the line. Thus, all liability of the caster's cutting or otherwise injuring the finger is avoided; and (2) Both hands of the caster are left free and available for making the cast. By using both hands in making the cast, the caster can make longer casts and reach places that heretofore have been unavailable with the old methods of casting.

While a preferred specific embodiment of the invention is hereinbefore set forth, it is to be clearly understood that the invention is not to be limited to the exact constructions, mechanisms, and devices illustrated and described, because various modifications of these details may be provided in putting the invention into practice within the purview of the appended claims.

For example, it is within the contemplation of the instant invention to provide backing members, such as 29, on both sides of the leaf spring 31, so that the degree of leaf spring resilience is the same in both directions of deflection. By this construction, the device may be employed as described hereinbefore for use in right-hand casting; and further, the entire device may be reversed on the rod, so that the leaf spring projects leftward for left-hand casting, the spring resilience being substantially the same for both left- and right-hand operation. It is also appreciated that the line release may be fixedly secured directly to the bracket member 15 of the spinning reel S, if desired, in which construction the clamp C may be dispensed with.

What is claimed is:

1. In combination, a jointed fishing rod including a handle section, a spinning reel carried by said handle section and including a fixed drum the axis of which is substantially parallel to the axis of said rod, a line on said drum, and a mechanical line release mounted on said handle section adjacent to the jointed end thereof and including a flexible resilient arm arranged normal to the extent of the rod and formed with a groove for receiving said line, said arm being laterally bendable under the force created by the making of a cast with said line whereby said line is automatically released from said groove and arm upon the making of a cast.

2. In a mechanical line release for a spinning reel, a clamp adapted to be secured to a fishing rod, a bracket carried by said clamp, and a resilient arm secured to said bracket, said arm being formed with a plurality of circumferential grooves therein any one of which is adapted to receive a line from a spinning reel carried by said rod in such a manner that the line may be automatically released therefrom when a cast is made.

3. In a mechanical line release for a spinning reel, a clamping ring adapted to encompass a fishing rod together with means for tightening said ring on said rod, a bracket depending from said ring, a backing member secured to one face of said bracket in engagement therewith, a leaf spring engaging said backing member and secured to said bracket with said backing member, and a grooved structure carried by said leaf spring and projecting beyond said backing member.

4. In a mechanical line release for a spinning reel, a clamping ring adapted to encompass a fishing rod together with means for tightening said ring on said rod, a bracket depending from said ring, a backing member secured to one face of said bracket in engagement therewith, a leaf spring engaging said backing member and secured to said bracket with said backing member, and a line-carrying member carried by said leaf spring and projecting beyond said backing member, said line-carrying member having a series of grooves formed therein each being defined by a flat ring-like surface and a conical surface that tapers inwardly toward said ringlike surface.

5. In a mechanical line release for a spinning reel, a resilient arm, a line-carrying member integrally joined to one end of said arm and having three grooves formed therein each of which is defined by a flat ringlike surface and an inwardly tapering conical surface, and means for mounting said arm on a fishing rod with the arm extending in a direction normal to the extent of the rod.

References Cited in the file of this patent

UNITED STATES PATENTS

| | | |
|---|---|---|
| 876,732 | Schmidt | Jan. 14, 1908 |
| 1,082,874 | Jeffers | Dec. 30, 1913 |
| 2,690,313 | McDermott | Sept. 28, 1954 |
| 2,761,237 | Piaja | Sept. 4, 1956 |

FOREIGN PATENTS

| | | |
|---|---|---|
| 839,627 | France | Apr. 7, 1939 |